United States Patent
Smales

(10) Patent No.: US 8,869,255 B2
(45) Date of Patent: *Oct. 21, 2014

(54) METHOD AND SYSTEM FOR ABSTRACTED AND RANDOMIZED ONE-TIME USE PASSWORDS FOR TRANSACTIONAL AUTHENTICATION

(75) Inventor: Antony Smales, Frankston (AU)

(73) Assignee: Forticom Group Ltd, Frankston (AU)

( * ) Notice: Subject to any disclaimer, the term of this patent is extended or adjusted under 35 U.S.C. 154(b) by 377 days.

This patent is subject to a terminal disclaimer.

(21) Appl. No.: 13/281,330

(22) Filed: Oct. 25, 2011

(65) Prior Publication Data

US 2012/0137352 A1 May 31, 2012

Related U.S. Application Data

(60) Provisional application No. 61/418,276, filed on Nov. 30, 2010.

(51) Int. Cl.
*G06F 7/04* (2006.01)
*G06F 21/31* (2013.01)

(52) U.S. Cl.
CPC ...................... *G06F 21/31* (2013.01)
USPC ............ 726/7; 726/5; 726/6; 726/18; 726/19; 713/182; 713/193

(58) Field of Classification Search
CPC ....................................................... G06F 21/31
USPC ........... 726/19, 5, 6, 7, 18; 713/202, 182, 193
See application file for complete search history.

(56) References Cited

U.S. PATENT DOCUMENTS

| | | | |
|---|---|---|---|
| 6,571,336 B1 | 5/2003 | Smith, Jr. | |
| 8,041,954 B2 | 10/2011 | Plesman | |
| 8,042,159 B2 | 10/2011 | Basner | |
| 2001/0039618 A1 | 11/2001 | Azuma | |
| 2002/0053035 A1 | 5/2002 | Schutzer | |
| 2005/0027990 A1 | 2/2005 | Ogawa | |
| 2005/0160297 A1* | 7/2005 | Ogawa | 713/202 |
| 2006/0020815 A1* | 1/2006 | Varghese et al. | 713/182 |
| 2006/0034456 A1 | 2/2006 | McGough | |
| 2006/0218406 A1* | 9/2006 | Kinoshita et al. | 713/182 |
| 2007/0250920 A1* | 10/2007 | Lindsay | 726/7 |
| 2008/0098464 A1* | 4/2008 | Mizrah | 726/5 |

(Continued)

OTHER PUBLICATIONS

Menezes et. al. (Handbook of Applied Cryptography, 1997).*

*Primary Examiner* — Brian F Shaw
(74) *Attorney, Agent, or Firm* — Birch, Stewart, Kolasch & Birch, LLP

(57) ABSTRACT

A security system and method for authenticating a user's access to a system is disclosed. The security system receives an authentication request from the user and responds by generating a security matrix based on a previously stored user keyword and user preference data, the security matrix being different for each authentication request. The security system sends the security matrix to the user and awaits a one-time code in response to the security matrix. The user forms the one-time code based on the user keyword, the user preferences, and the security matrix. The security system validates the one-time code against the security matrix, the keyword, and the user preferences, and responds by sending an authentication result to the user that either permits or denies access to the system. Additionally, the security system sends a success or fail message to the system to be accessed.

24 Claims, 16 Drawing Sheets

(56) References Cited

U.S. PATENT DOCUMENTS

| | | |
|---|---|---|
| 2008/0229397 A1* | 9/2008 | Basner et al. .................. 726/5 |
| 2008/0292097 A1 | 11/2008 | Lin |
| 2008/0294910 A1 | 11/2008 | Lin |
| 2009/0259588 A1 | 10/2009 | Lindsay |
| 2009/0319776 A1 | 12/2009 | Burch et al. |
| 2010/0218241 A1 | 8/2010 | Faryna |
| 2011/0138446 A1 | 6/2011 | Barrett et al. |
| 2011/0197266 A1 | 8/2011 | Chu |
| 2012/0137352 A1 | 5/2012 | Smales |

* cited by examiner

*Authentication Request 11*
Unique User ID
ID of the system requesting the authentication

*One-Time Code 12*
Unique User ID
ID of the system requesting the validation
One-Time Code as entered by the end user

*Security Matrix 31*
Collection of Key/Value pairs composed according to the Secure System Preferences 50

*Authentication Result 32*
Session ID, OK, or Error

*Success Message 33*
Unique User ID
ID of the system validated against
Session ID Table 1

FIG. 11

| Segment | Option | Description |
|---|---|---|
| Order | Linear abstraction | Key letters presented in a linear order of A to Z, 0 to 9 |
| Order | Random abstraction | Key letters presented in a randomised order |
| Offset | Positive offset | Amount to be added to each Value associated to the Key. Numbers wrap such that 9+1 = 0 and Letters wrap such that Z+1 = A. i.e. +1 |
| Offset | Negative offset | Amount to be subtracted from each Value associated to the Key. Numbers wrap such that 0-1 = 9 and Letters wrap such that A-1 = Z. i.e. -1 |
| Crawl | Positive increment | Amount added to each Value associated to the Key and then incremented. Numbers wrap such that 9+1 = 0 and Letters wrap such that Z+1 = A. i.e. +1 (causing the sequence 0,1,2,3,4,5,6 to be added incrementally) |
| Crawl | Negative increment | Amount subtracted from each Value associated to the Key and then decremented. Numbers wrap such that 0-1 = 9 and Letters wrap such that A-1 = Z. i.e. -2 (causing the sequence 0,-2,-4,-6,-8 to be subtracted incrementally) |
| Jump | Odd | Amount is added to every Value located at an odd index of the keyword and subtracted from every Value located at an even index of the keyword |
| Jump | Even | Amount is subtracted from every Value located at an odd index of the keyword and added to every Value located at an even index of the keyword |
| Mask | As defined | A Mask is a template extension to the keyword, such that a placeholder is defined at certain indexes of the keyword. The placeholder can be any number/letter/symbol and is not affected by any other option. Additionally, the # symbol represents a wildcard match, allowing the user to define a keyword that appears longer than it really is. |

Table 3

FIG. 12

| Segment | Option | Description |
| --- | --- | --- |
| Return Format | XML | Security Matrix is returned as an XML structure |
| Return Format | HTML | Security Matrix is returned as a preformatted HTML inclusion |
| Return Format | Image | Security Matrix is returned as an image |
| Return Format | CSV | Security Matrix is returned as comma separated plain text |
| Key Scope | Set of A to Z, a to z, 0 to 9, symbols or images | Security System builds the Security Matrix KEYS using this selection of information. This information also determines the valid keyword composition. |
| Value Scope | Set of A to Z, a to z, 0 to 9, symbols or images | Security System builds the Security Matrix VALUES using this selection of information |

Table 4

FIG. 13

METHOD AND SYSTEM FOR ABSTRACTED AND RANDOMIZED ONE-TIME USE PASSWORDS FOR TRANSACTIONAL AUTHENTICATION

CROSS-REFERENCE TO RELATED APPLICATIONS

This application claims priority to U.S. provisional patent application no. 61/418,276, filed on Nov. 30, 2010 and titled "METHOD AND SYSTEM FOR ABSTRACTED AND RANDOMIZED ONE-TIME USE PASSWORDS FOR TRANSACTIONAL AUTHENTICATION", which application is incorporated by reference into the present application.

FIELD OF THE INVENTION

The present invention relates generally to authentication systems and methods and more particularly to authentication systems that are highly secure.

DESCRIPTION OF THE RELATED ART

Security relating to personal identity has become the fundamental cornerstone of all transactions in the modern electronic world, with high levels of investment being applied to security and authentication methods, the technology to support it, and also to the hacking thereof. Most of the banking world depends on a pre-arranged personal identification number (PIN), which is a secret numeric password shared between a user and a system to authenticate the user to the system, while most electronic systems with full-text interfaces depend upon Passwords.

It is common practice to trust heavily in cryptographic hash functions (CHF). These deterministic procedures take arbitrary data and return a mathematically calculated hash value that is unique to the data. A well-documented example of a CHF is the MD5 algorithm. Hash functions and smart security methods between the client and the server make it difficult to reverse-engineer the individual's Password or PIN from a copy of the data. However, using visual observation along with phishing techniques, most passwords or PINs can be compromised thereby allowing fraudulent transactions to be processed. Therefore, it is desirable to have a security scheme that reduces the likelihood that an authentication can be compromised.

BRIEF SUMMARY OF THE INVENTION

One embodiment of the present invention is a method for abstracting the interaction with a Client Interface such that every time the User wishes to authenticate against a Secure System, the Security System presents to the user a one-time randomized set of characters and numbers in a form that allows him to use a predefined Keyword to determine the PIN that matches the randomized Keyword.

More specifically, an embodiment of the present invention is a method for validating a user's authenticity to access a secure system. The method includes the steps of receiving an authentication request from the user, generating a security matrix based on a user ID and user preference data and sending said matrix to the user, receiving a one-time code from the user in response to the security matrix, validating the one-time code based on the security matrix, the user ID, at least one user keyword, and user preference data, after validating the one-time code, sending an authentication result to the user, said authentication result being based on the one-time code, the security matrix, the user ID, the user keyword, and user preferences; and sending a success or fail message, distinct from the authentication result, to the secure system based on the authentication result.

Yet another embodiment of the present invention is a security system for validating a user's authenticity to access a secure system. The security system includes a security computer and a client interface. The security computer is programmed to store a user keyword and user preference data, to receive an authentication request including a user ID from the user to access the secure system and to generate a security matrix in response to said authentication request based on stored user preference data and the user ID, to send the security matrix to the user and to receive from the user a one-time code, to validate the one-time code using the generated security matrix, the user keyword, and user preference data and to send an authentication result based on the validation to the user, and to send a success or fail message, distinct from the authentication result, to the secure system based on the authentication result. The client interface enables the user to transmit to the security system an authentication request to access the secure system, receives and displays the security matrix, and enables the user to send the one-time code to the security system.

Under present method, there is no correlation between the User's Keyword and the Security Matrix provided to the user for him to validate against. A Security System randomly constructs The Security Matrix and the User employs the Security Matrix to determine the One-Time Code that is valid for that User and for that Security Matrix. Each request to authenticate results in a new Security Matrix being calculated ensuring the probability of determining the Keyword to be minimal.

The present invention is a novel approach to authentication security, allowing the user to define one or more Keywords, which are then used as a personal reference, enabling the User to create a One-Time Code from a randomized, system-generated Security Matrix. A Keyword is never directly entered during the authentication process at any stage and should never be disclosed or shared.

By separating the authentication process into three phases, (i) request to authenticate, (ii) validation of credentials, and (iii) the transmittal of the authorization details, a security method is produced that can have all transactional authentication requests observed, recorded, and analyzed between the User, the Client Interface, and the Security System, while keeping it improbable that the user's keyword can be identified.

The strength of the Security Matrix can be altered by the user to make determination simpler or more complex, not the system he is authenticating against.

The method of the present invention can be applied to any system requiring User Authentication with minimal changes to the Secure System or the User experience. Because the Security Matrix and the One-Time Code are fully abstracted from the Keyword, there is no pressing security requirement to encode them for transmission in either direction. Thus, method of the present invention is highly suited to any system where the connection between the Client Interface and the Secure System can easily be monitored or observed.

The method can be implemented for a single system, multiple systems, or as a unified public validation system, and works against any transaction that requires a user to validate his identity.

BRIEF DESCRIPTION OF THE DRAWINGS

These and other features, aspects and advantages of the present invention will become better understood with regard to the following description, appended claims, and accompanying drawings where:

FIG. 11 shows Message Structure Definitions;

FIG. 12 shows User Preferences;

FIG. 13 shows Secure System Preferences;

DETAILED DESCRIPTION OF THE INVENTION

In the following description the following identifications are used.

The Secure System 20 is a system that requires a User to authenticate as a pre-requisite to processing transactions or requests for information.

The Security System 30 is the system in which the User's Keyword and Preferences, the Secure Systems preferences are stored and where processing for the Security System's interfaces is performed.

Authentication Request 11
Security Matrix 31
One-Time Code 12
Authentication Result 32
Success Message 33

The User Preferences 40 are defined in Table 3 and are stored internally by the Security System 30.

A keyword 41 is a linear string of alpha characters that is defined by the User 10. In the examples given, the keyword is limited to being alpha characters only (A to Z) however, the method and system supports Alpha (case sensitive or case insensitive), Numeric, Symbolic or any combination thereof.

The Secure System Preferences 50 are defined in Table 4 and are stored internally by the Security System 30.

A Client Interface 60 is the Human Machine Interface (HMI) where a User 10 is required to interact with a keyboard, touch screen, pin pad, or other entry device to provide authentication details, e.g., an Automated Teller Machine or a logon screen to an internet service.

Figure 1:
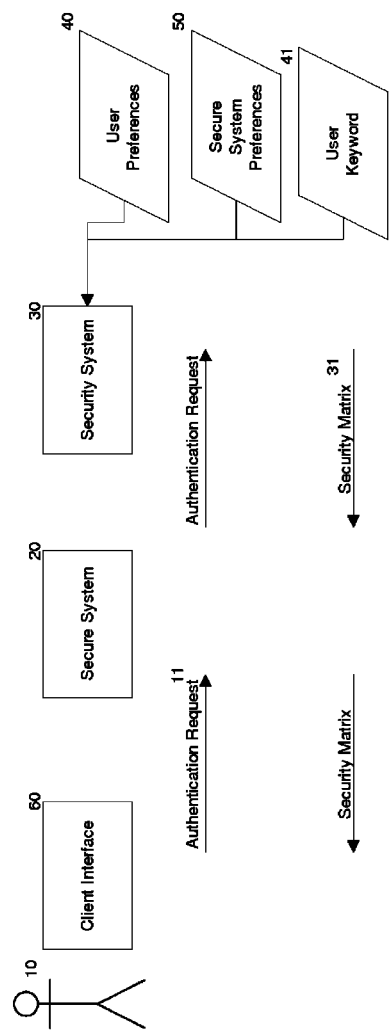
FIG. 1 shows an Authentication request.

In FIG. 1, a User 10 has previously provided to the Security System 30 User Preferences 40 and a Keyword 41. The Keyword 41 is stored in an encrypted form on the Security System 30 and is never transmitted in any function.

In FIG. 1, a User 10 requests to authenticate at a Client Interface 60, which in turn sends the Authentication Request 11 to the Secure System 20 which forwards the Authentication Request 11 to the Security System 30.

Figure 2:
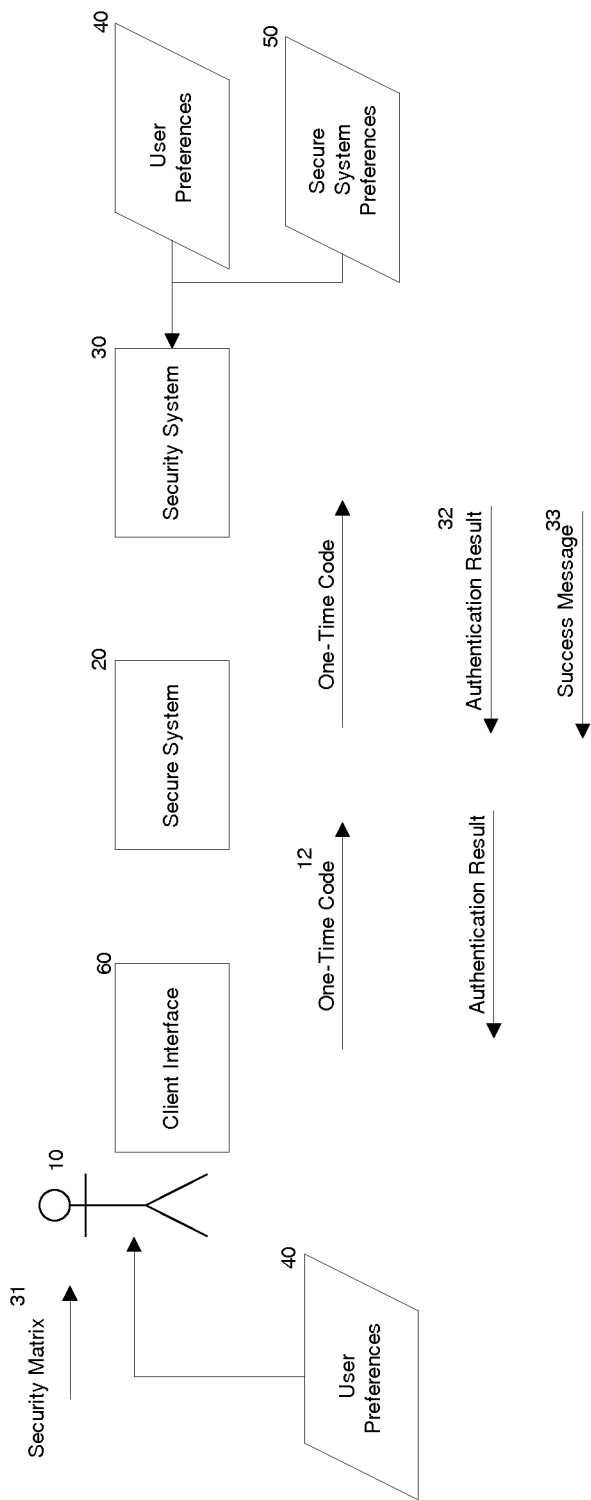
FIG. 2 shows a Validation request.

In FIG. 2, the Secure System Preferences data 50 is used to determine the format required and the limitations of the Client Interface 60. The User Preferences data 40 is used to determine the complexity level of the Security Matrix 11 that the User 10 prefers. The security system 30 produces a Security Matrix 31 and sends it back to the Secure System 20, which then forwards the Security Matrix 31 directly to the Client Interface 60 or uses the information within it to build a custom representation of the Security Matrix 31, which it then presents to the User 10. The format of the user ID is system independent and can be any unique ID across all systems being supported by the security server. Examples of a user ID are a customer ID or an email address.

In FIG. 2, a User 10 authenticates, using the presented Security Matrix 31 to determine the One-Time Code number 12 by applying the User Preferences 40 in association with the Keyword 41. This One-Time Code number 12 is entered into the Client Interface 60, which is then sent to the Secure System 20 and then to the Security System 30 where it is validated by the Security System 30 by using the Security Matrix 31 data in conjunction with the One-Time Code 12, the User's 10 stored keyword 41, and the User Preferences 40. In response to the request, the security system 30 then returns an Authentication Result 32 back to the Secure System 20, which is then sent back to the Client Interface 60. A second interaction occurs in parallel in which the security system 30, upon a successful authentication, then initiates a send of the Success Message 33 to the Secure System 30's success notification point as detailed in the Secure System Preferences 50.

Every Authentication Request 11 and every One-Time Code 12 validation, results in the Security Matrix 31 being re-randomized to prevent reuse. A log of Authentication Requests 11 and One-Time Code 12 requests is maintained for limiting the maximum number of attempts in a given timeframe to prevent brute force attacks and for providing an auditable trace.

Figure 3:
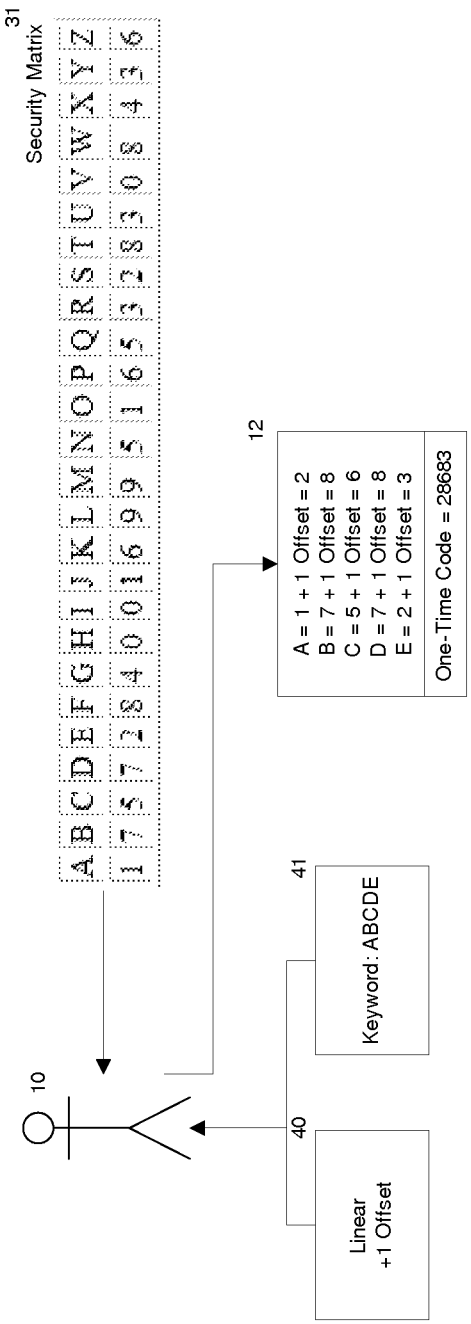
FIG. 3 shows a first example of a One-Time Code in which an offset is used.

The example in FIG. 3 shows a Security Matrix 31, the user preference data 40 and the user Keyword 41. The User 10 uses his keyword and User Preferences data 40 to generate the One-Time Code 12.

In this example, the User 10 prefers:

(a) The Security matrix 31 be displayed Alphabetically; and (b) To add 1 to the displayed number that corresponds to the keyword letters Obtaining the matrix value for each character of the Keyword yields 17572. Adding an offset of +1 to the matrix result gives 28683 as the One-Time Code 12.

Figure 4:
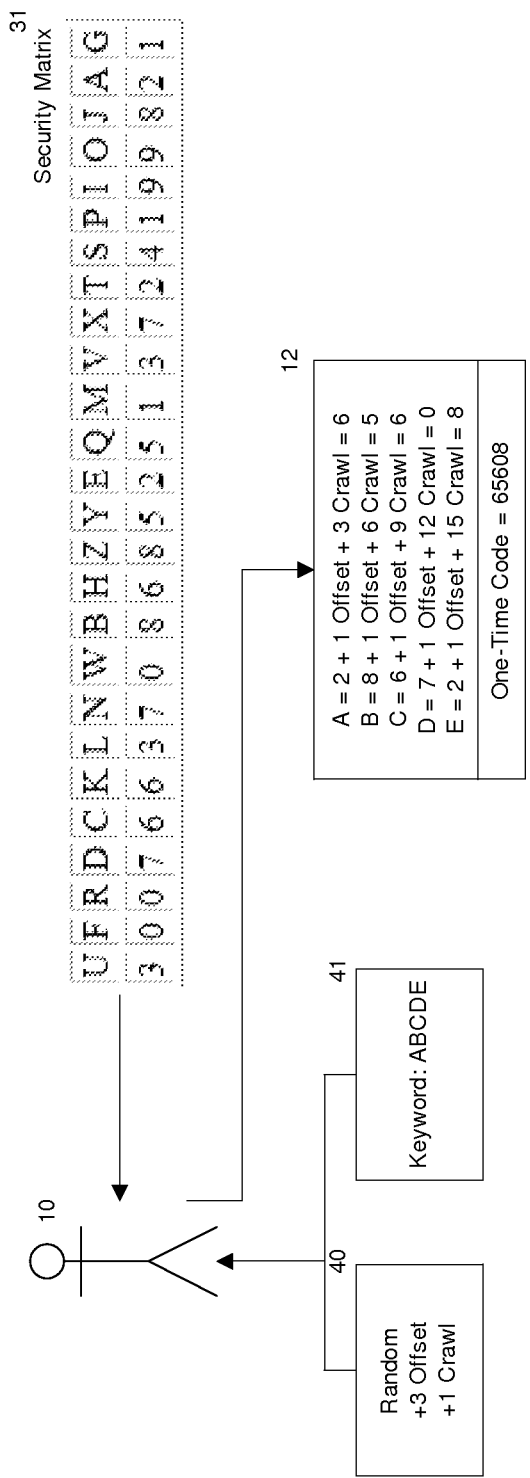
FIG. 4 shows a second example of a One-Time Code in which an offset and crawl are used.

The example in FIG. 4 shows a Security Matrix 31, the user preferences 40 and the user Keyword 41. The User 10 uses his keyword and User Preferences 40 to generate the One-Time Code 12.

In this example, the User 10 prefers:

(a) The Security matrix 31 be displayed in Random order;

(b) To add 1 to the number displayed against the keyword letters; and (c) To add an extra 3 to the first keyword letter, and extra 6 to the second keyword letter and so on.

Obtaining the matrix value for each character of the key word yields 28672. Adding a +1 offset yields 39783. Adding a +3 crawl yields 65608, which is the One-Time Code. Note that in the example addition is modulo ten but can be any modulo addition.

Figure 5:
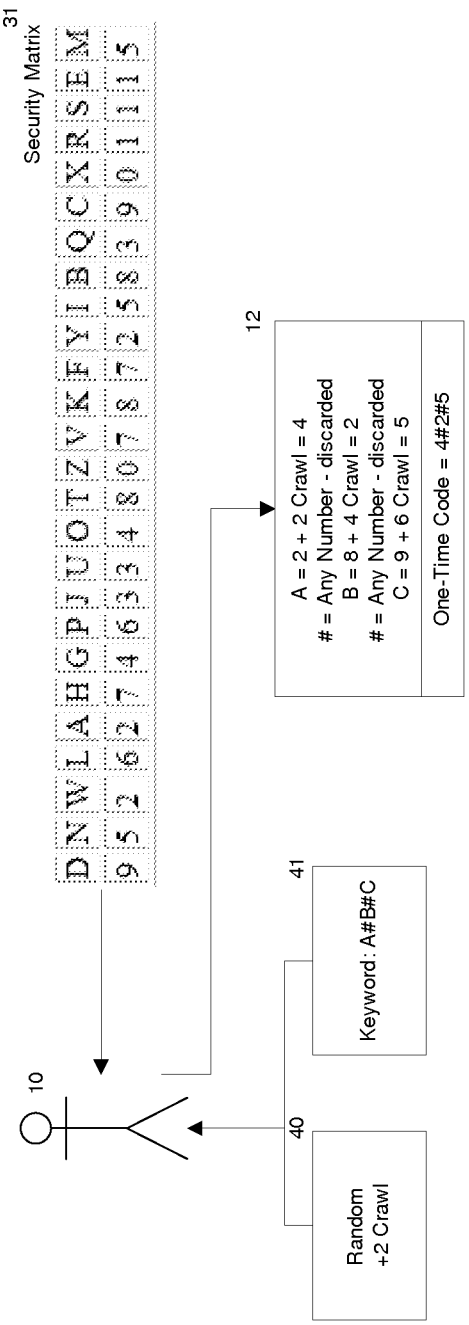
FIG. 5 shows a third example of a One-Time Code in which a crawl is used.

The example in FIG. 5 shows a Security Matrix 31, the user preferences 40 and the user Keyword 41. The User 10 uses his keyword and User Preferences 40 to generate the One-Time Code 12.

In this example, the User 10 prefers:
(a) The Security matrix 31 be displayed in Random order;
(b) To add 2 to the first keyword letter, 4, to the second keyword letter and so on; and
(c) The second and fourth numbers to be any number the user wishes in this example, a valid One-Time Code response is
  a. 41215
  b. 42225
  c. 43235
  d. 41235
  e. 49285
  f. and so on—only the first, third and fifth numbers are relevant.

Obtaining the matrix value for each character of the key word yields 2#8#9. Adding a +2 crawl gives 4#2#5, which is the One-Time Code. Note again that addition is module 10.

Figure 6:
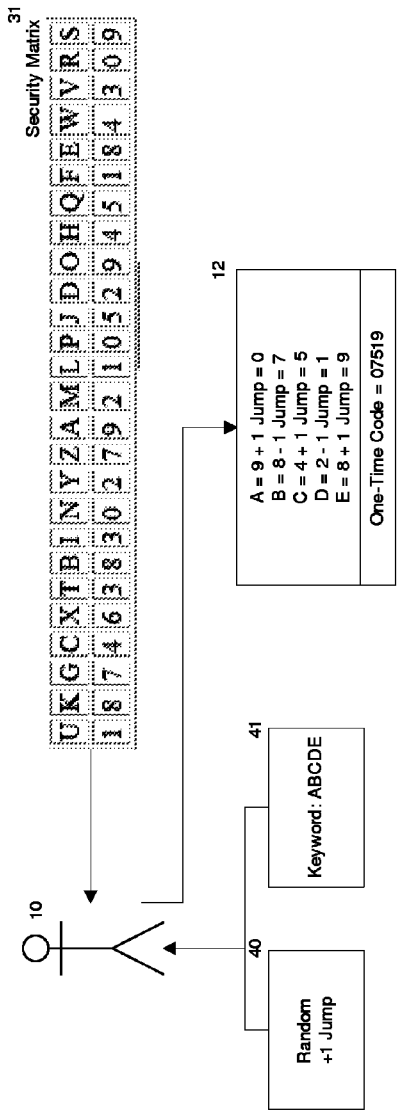
FIG. 6 shows a fourth example of a One-Time Code in which a jump is used.

The example in FIG. 6 shows a Security Matrix 31, the user preferences 40 and the user Keyword 41. The User 10 uses his keyword and User Preferences 40 to generate the One-Time Code 12.

In this example, the User 10 prefers:
(a) The Security matrix 31 be displayed in Random order;
(b) To add 1 to the first keyword letter, subtract 1 from the second keyword letter, add 1 to the third keyword letter and so on.

Obtaining the matrix value for each character of the key word yields 98428. Adding a +1 jump gives 07519, which is the One-Time Code. Again, addition or subtraction is modulo 10.

Figure 7A:
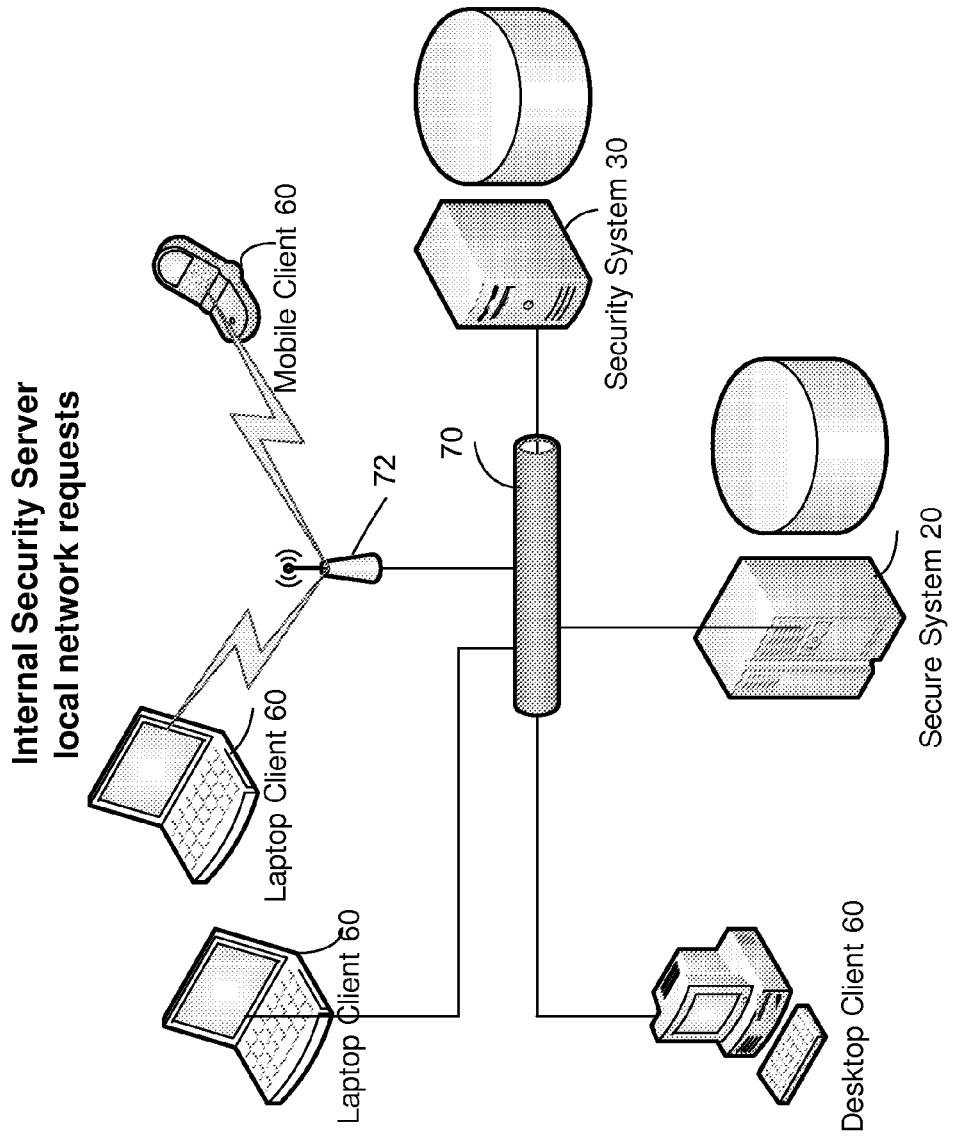
FIG. 7A shows an example architecture of an Internal Security Server for Local Authentication.

In FIG. 7A, an internally hosted Security System 30 is utilized by a Secure System 20 to validate users 60 that are logging onto it through a Local Network 70 to which the user is connected either by wire or wirelessly via wireless transceiver 72.

Step 1: User accesses Secure System logon portal—only requested to supply User ID, which could be an email address, in accordance with 82 and 84 of FIG. 7B.

Step 2: User enters User ID, as in 84 of FIG. 7B.

Step 3: Secure System sends User ID and System ID to Security System, which performs validation and returns a Security Matrix 31 as in 86 of FIG. 7B, which is then displayed by the Secure System 20 back to the User 60.

Step 4: User enters One-Time Code 12 and logs in as normal, as in 86 of FIG. 7B. Secure System 20 sends One-Time Code 12, User ID, and System ID to Security System 30, which validates the code and provides a Session ID to the Secure System 20 if it is valid.

Figure 8:
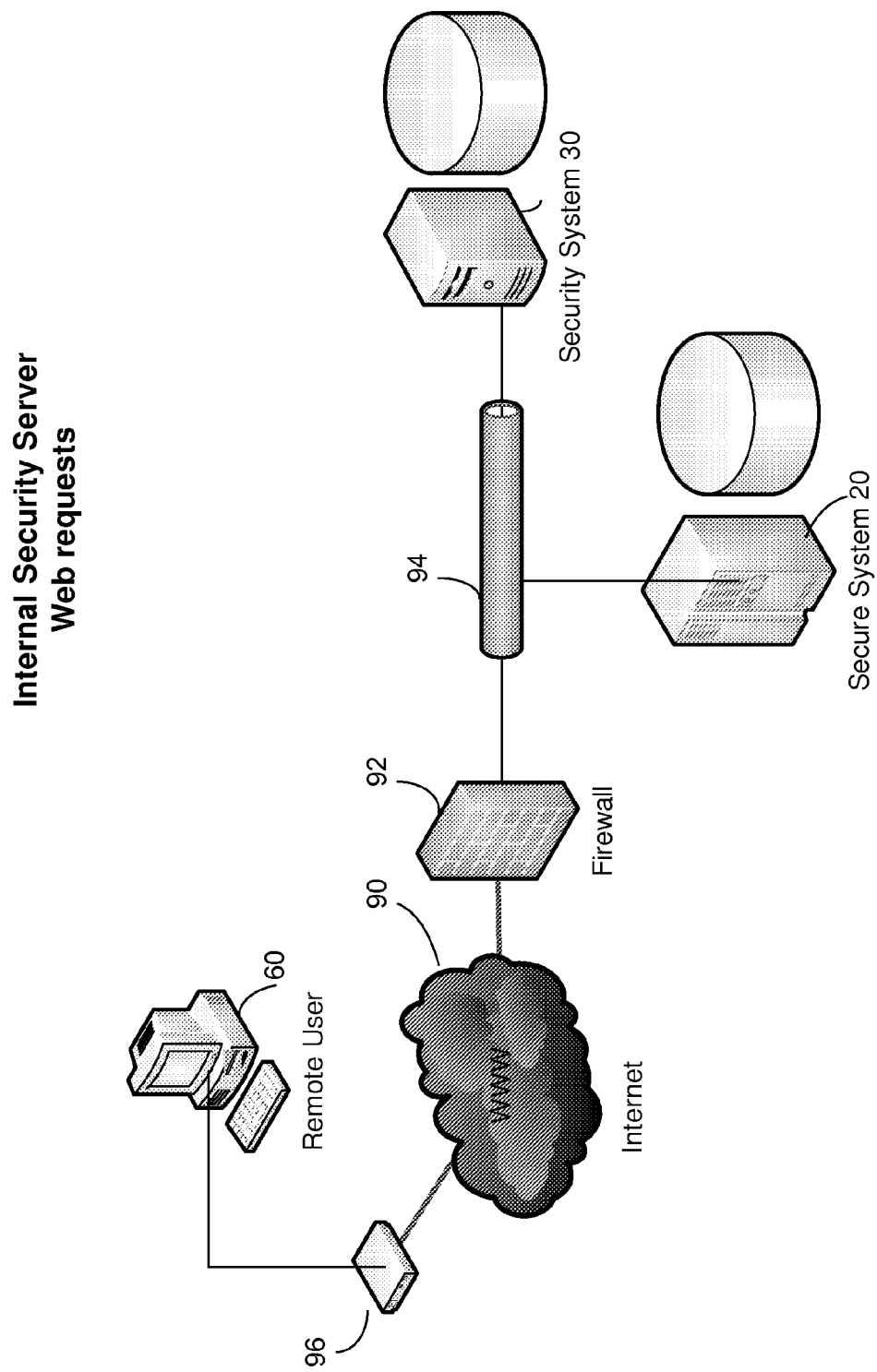
FIG. 8 shows an example architecture of an Internal Security Server for Remote Web Authentication.

In FIG. 8, an internally hosted Security System 30 is utilized by a Secure System 20 to validate users 60 that are logging onto it through the Internet 90, say through modem 96.

Step 1: Remote User accesses Secure System logon portal—only requested to supply User ID, which could be an email address, in accordance with 82 and 84 of FIG. 7B.

Step 2: User enters User ID, as in 84 of FIG. 7B.

Step 3: Secure System sends User ID and System ID to Security System 30, which performs validation and returns a Security Matrix 31, which is then displayed by the Secure System 20 back to the User 60.

Step 4: User enters One-Time Code and logs in as normal, as in 86 of FIG. 7B. Secure System 20 sends One-Time Code 12, User ID, and System ID to Security System 30, which validates the code and provides a Session ID to the Secure System 20 if it is valid.

Figure 9:
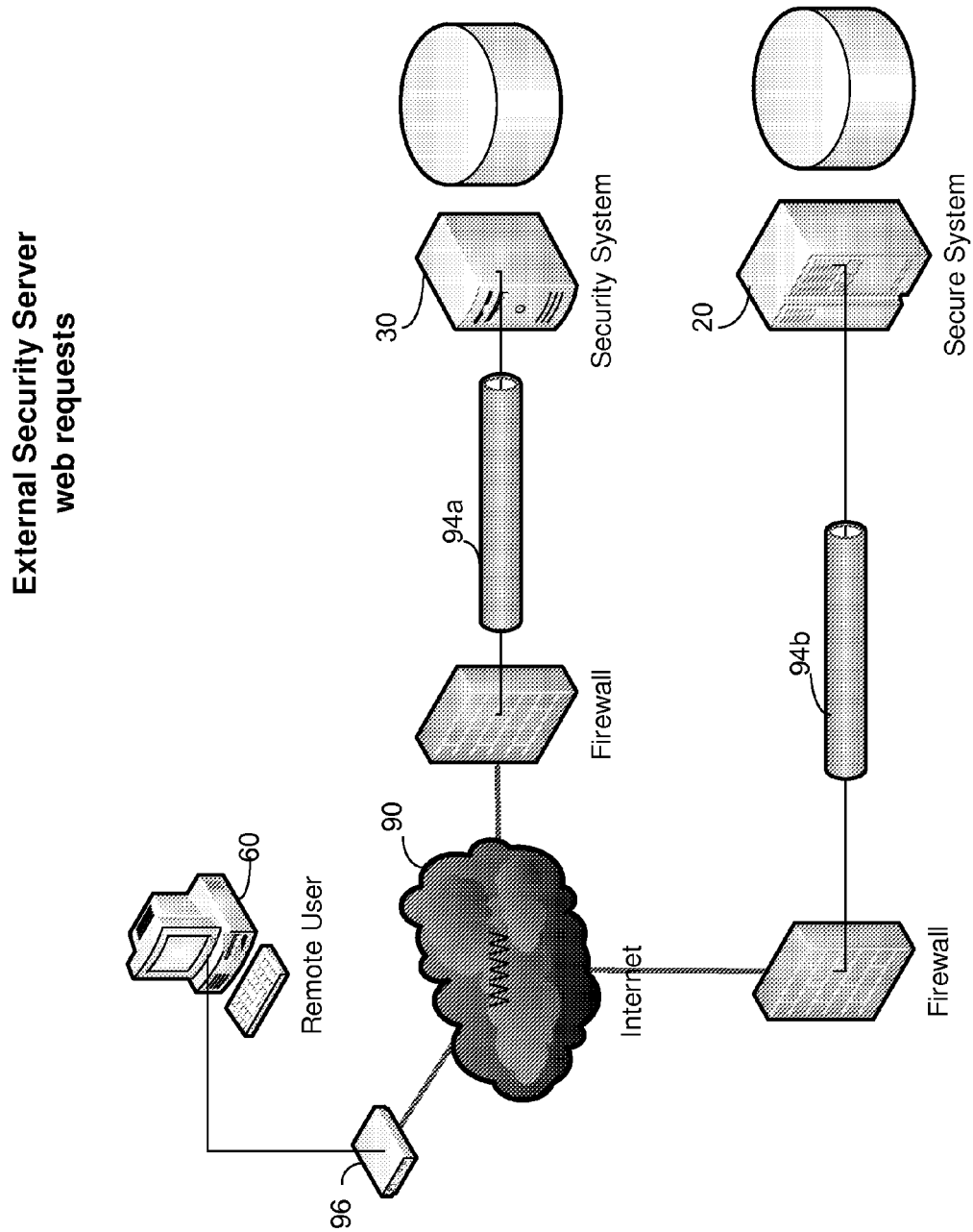
FIG. 9 shows an example architecture of an External Security Server for Remote Web Authentication.

In FIG. 9, a publicly hosted Security System 30 is utilized by a Secure System 20 to validate users 60 that are logging onto it through the Internet 90. In this configuration, a single Security System 30 can service multiple Secure Systems 20, allowing Users 60 to have one keyword for all registered systems. As before, remote users 60 connect through a modem 96 to the Internet 90.

Step 1: Remote User 60 accesses Secure System 20 logon portal—only requested to supply User ID, which could be an email address, in accordance with 82 and 84 of FIG. 7B.

Step 2: User 60 enters User ID, as in 84 of FIG. 7B.

Step 3: Secure System 20 sends User ID and System ID to Security System 30, which performs validation and returns a Security Matrix 31, which is then displayed by the Secure System 20 back to the User 60.

Step 4: User 60 enters One-Time Code and logs in as normal. Secure System 20 sends One-Time Code, User ID, and System ID to Security System 30, which validates the code and provides a Session ID to the Secure System 20 if it is valid.

Figure 10:
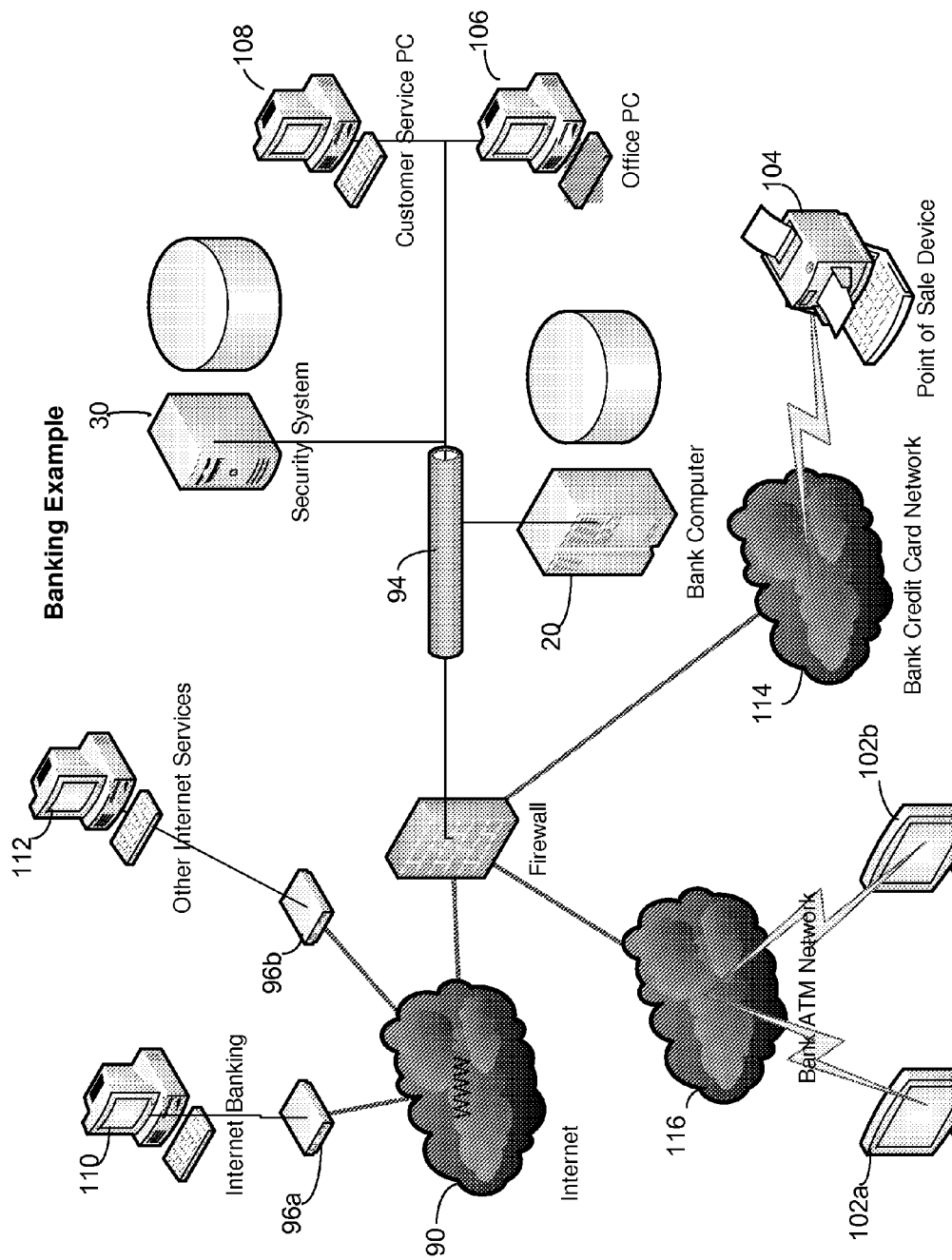
FIG. 10 shows an example architecture of an Internal Security Server for Internal and External Web Authentication and Internal System Authentication.

In FIG. 10, an internal security system 30 is configured to service a financial institution across its entire business, effectively replacing standard authentication systems such as passwords and PIN numbers for debit and credit systems at the counter, ATM (Automated Teller Machine), merchant sale or Internet. The example above shows:
(a) Internet banking via the internet
(b) Other internet services such as shares or foreign exchange
(c) ATMs
(d) Points of sale
(e) Customer Service PC
(f) Office PCs.

The above systems are described below.

Internet Banking Via the Internet

Figure 7B:
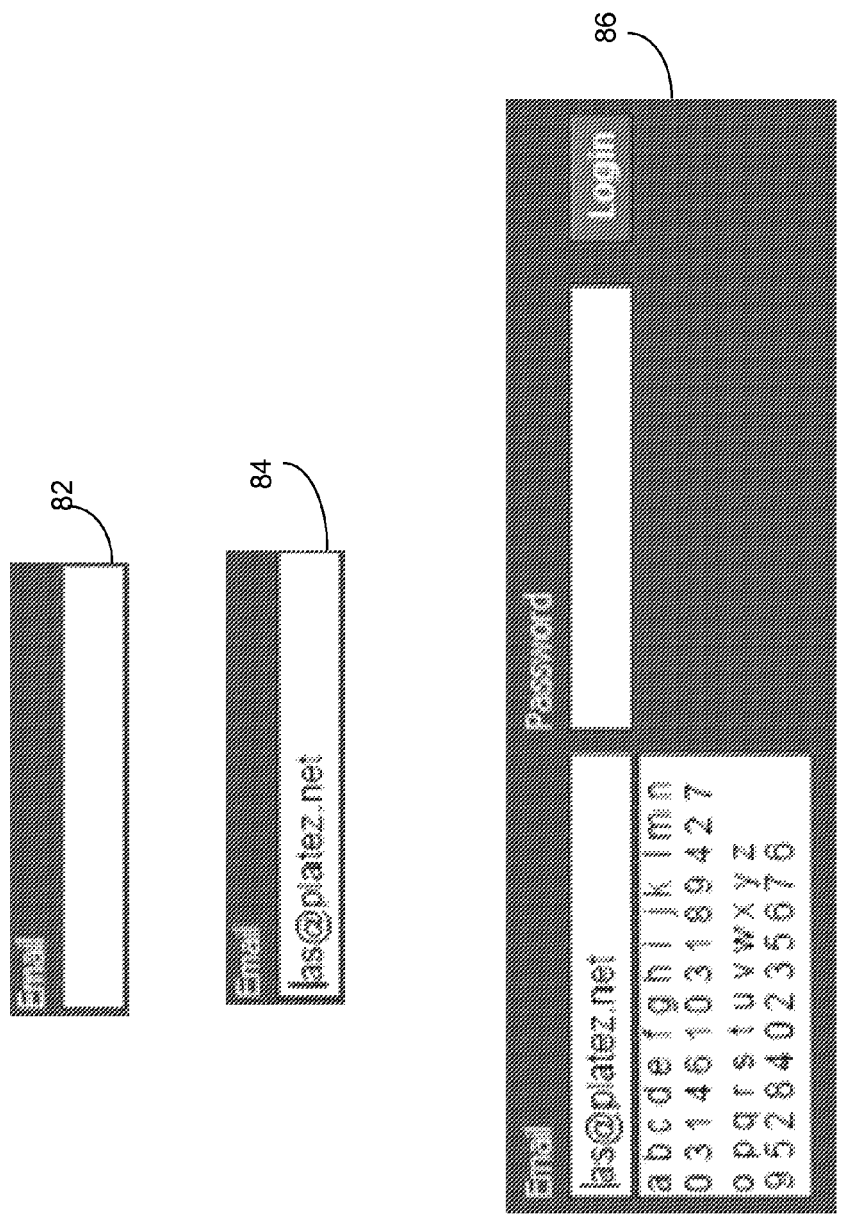
FIG. 7B shows portions of the Client Interface during the authentication process.

If a user logs onto the bank's Internet portal 90 as normal, however the logon process only requests that the user's User ID be submitted, in accordance with 82, 84 in FIG. 7B. Upon receiving the user ID, the Bank Computer 20 contacts the Security System 30 with the User's ID and the Bank's System ID. Upon validating the User ID and System ID, the Security System 30 generates a Security Matrix and returns it to the Bank Computer 20, which then displays it to the User 110 along with a request to enter the One-Time Code, as in 86 of FIG. 7B. Using the Security Matrix, the User works out the One-Time Code and enters it into the system. The One-Time Code is returned to the Bank Computer 20, which then forwards the One-Time Code, User ID, and Bank System ID back to the Security System 30 where the One-Time Code is validated. If Valid, a Session ID is created and passed back to the Bank Computer 20, which is then passed back to the Internet Application 110 to form part of all subsequent requests made to the Bank Computer 20.

Other Internet Services Such as Shares or Foreign Exchange

A user logs onto the bank's internet portal as normal, however the logon process only requests that the user's User ID be submitted, in accordance with 82, 84 in FIG. 7B. Upon receiving the user ID, the Bank Computer 20 contacts the Security System 30 with the User's ID and the Bank's System ID. Upon validating the User ID and System ID, the Security System 30 generates a Security Matrix and returns it to the Bank Computer 20, which then displays the matrix to the User 112 along with a request to enter the One-Time Code. Using the Security Matrix, the User 112 works out the One-Time Code and enters it into the system. The One-Time Code is returned to the Bank Computer 20, which then forwards the One-Time Code, User ID, and Bank System ID back to the Security System 30 where the One-Time Code is validated. If Valid, a Session ID is created and passed back to the Bank Computer 20 which is then passed back to the Internet Application 112 and forms part of all subsequent requests made to the Bank Computer 20.

ATMs

A user inserts an ATM or Credit Card into the bank's ATM 102a, 102b as normal upon which the ATM transmits the user ID and any other pertinent information to the Bank Computer 20 via the Bank ATM network 116. The Bank Computer 20 then contacts the Security System 30 with the User ID and the Bank's System ID. Upon validating the User ID and System ID, the Security System 30 generates a Security Matrix and returns it to the Bank Computer 20, which then returns the matrix to the ATM 102a, 102b to be displayed to the User. Using the Security Matrix, the User 102a, 102b works out the One-Time Code and enters it into the ATM keypad. The One-Time Code is returned via the Bank ATM network 116 to the Bank Computer 20, which then forwards the One-Time Code, User ID, and Bank System ID back to the Security System 30 where the One-Time Code is validated. If Valid, a Session ID is created and passed back to the Bank System 20 to form part of all subsequent requests made to the Bank Computer 20.

Point of Sale

A user enters/swipes an ATM or Credit Card into the vendor's point of sale device 104 and the sale price is entered by the vendor as normal and information is sent back to the Bank Computer 20 via the Bank Credit Card Network 114. The Bank Computer 20 then contacts the Security System 30 with the User ID and the Bank's System ID. Upon validating the User ID and System ID, the Security System 30 generates a Security Matrix and returns it to the Bank Computer 20, which then returns it to the point of sale device 104 to be either displayed on the screen if it is capable or printed on the paper receipt. Using the Security Matrix, the User works out the One-Time Code and enters it into the point of sale keypad 104. The One-Time Code is returned to the Bank Computer 20, which then forwards the One-Time Code, User ID and Bank System ID back to the Security System 30 where the One-Time Code is validated. If Valid, a Session ID is created and passed back to the Bank System 20 which then processes the rest of the transaction as normal.

Customer Service PC

Upon approaching a customer service point within a Branch of the Bank, the User identifies himself using Banking Cards or any other valid identification method that allows the Customer Service Representative to identify the user's User ID and enter it into the Customer Service Portal 108. The Customer Service PC 108 sends the User ID to the Bank's Computer 20. The Bank Computer 20 then contacts the Security System 30 with the User ID and the Bank's System ID. Upon validating the User ID and System ID, the Security System 30 generates a Security Matrix and returns it to the Bank Computer 20, which then returns it to the Customer Service PC 108 to be displayed to the User. Using the input device provided, the User works out the One-Time Code and enters it in the Customer Service PC 108. The One-Time Code is returned to the Bank Computer 20, which then forwards the One-Time Code, User ID, and Bank System ID back to the Security System 30 where the One-Time Code is validated. If Valid, a Session ID is created and passed back to the Bank System 20, which is then passed back to the Customer Service PC 108 to form part of all subsequent requests made to the Bank Computer.

Office PCs

A user logs onto the corporate network by logging in through the normal portal 106, however the logon process only asks for the user's user ID to be submitted. Upon submitting the user ID, the Bank Computer contacts the Security System 30 with the User's ID and the Bank's System ID. Upon validating the User ID and System ID, the Security System 30 generates a Security Matrix and returns it to the Bank Computer 20, which then displays it to the User along with a request to enter the One-Time Code. Using the Security Matrix the User works out the One-Time Code and enters it into the Office PC system 106. The One-Time Code is returned to the Bank Computer 20, which then forwards the One-Time Code, User ID, and Bank System ID back to the Security System 30 where the One-Time Code is validated. If Valid, a Session ID is created and passed back to the Bank Computer 20 which then passes it back to the Office PC 106 to form part of all subsequent requests made to the Bank Computer 20.

User Panic Support

In one embodiment, the security system is further enhanced to allow for panic support. In this embodiment, a user or the system owner uses a particular prefix number or an alternative keyword instead of the normal keyword to form the one-time code from the security matrix. When the Security System 30 validates the one-time code and determines that the alternative keyword was used, it triggers a panic alert that is passed onto the Secure System 20. This provides an opportunity for the Secure System 20 to respond in a manner which protects the person under duress, e.g., by showing a significantly reduced available balance for internet or ATM systems 102a, 102b, or reporting to security while providing "sandboxed" access to a business system.

FIG. 11 shows Message Structure Definitions. The messages are Authentication Request Message 11, One-Time Code Message, Security Matrix Message 31, Authentication Result Message 32, and the Success Message 33. The Authentication Request Message 11 includes the Unique User ID, and in some embodiments, the ID of the system requesting Authentication. The One-Time Code message includes the Unique User ID, and in some embodiments, the ID of the system Requesting Authentication, and the One-Time Code as entered by the user. The Security Matrix Message 31 includes the collection of Key, Value pairs composed in accordance with the Secure System Preferences 50. The Authentication Result Message 32 includes in some embodiments the Session ID, a success indication or an error indication. The Success Message 33 includes a Unique User ID and in some embodiments the ID of the system validated against and the Session ID.

FIG. 12 shows User Preferences. The user preferences include an order parameter, an offset parameter, a crawl parameter, a jump parameter, and a mask parameter. According to the order parameter, a linear abstraction means that the Matrix has the key letters presented in linear order from A to Z and from 0 to 9. A random abstraction means that the Matrix has the key letters presented in a randomized order.

The offset parameter specifies either a positive offset or a negative offset. With a positive offset, a positive amount is added to each Value associated with the Key. Addition is modulo 10 and letters are modulo 26, so that Z+1=A. With a negative offset, a negative amount is added to each Value associated with a Key. Addition is modulo 10 for numbers and modulo 26 for letters.

The Crawl parameter specifies either a positive increment or a negative increment. A positive increment means that a positive specified amount is added to a Value associated with a Key and then incremented by the specified amount for the next addition. A negative increment means that a negative specified amount is added to a Value associated with a Key and then incremented by the specified amount for the next addition. Again, addition is module 10 for numbers and modulo 26 for letters.

The Jump parameter specifies either an odd or even amount for a jump. If Odd is specified, then a specified amount is added to every Value associated with a Key at an odd index of the Keyword and subtracted from every Value located at an even index of the Keyword. If Even is specified, then a specified amount is subtracted from every Value associated with a Key at an odd index and added to every Value located at an even index of the Keyword. Addition or subtraction is modulo 10 for numbers and modulo 26 for letters.

The Mask parameter specifies that a specified character at one or more indices in the Keyword is not to be altered by an other Parameter. Additionally, the hash mark (#) at a location in the Keyword represents a wildcard match at which the user can enter any number or symbol in that location.

FIG. 13 shows Secure System Preferences. These preferences specify a Return Format, a Key Scope and a Value Scope. The Return Format can be either XML, HTML, an Image, or CSV text. The Key Scope specifies that the Security System should build the Security Matrix Keys using the specified characters. The Value Scope specifies that the Security System should build the Security Matrix Values using the specified characters.

Figure 14:
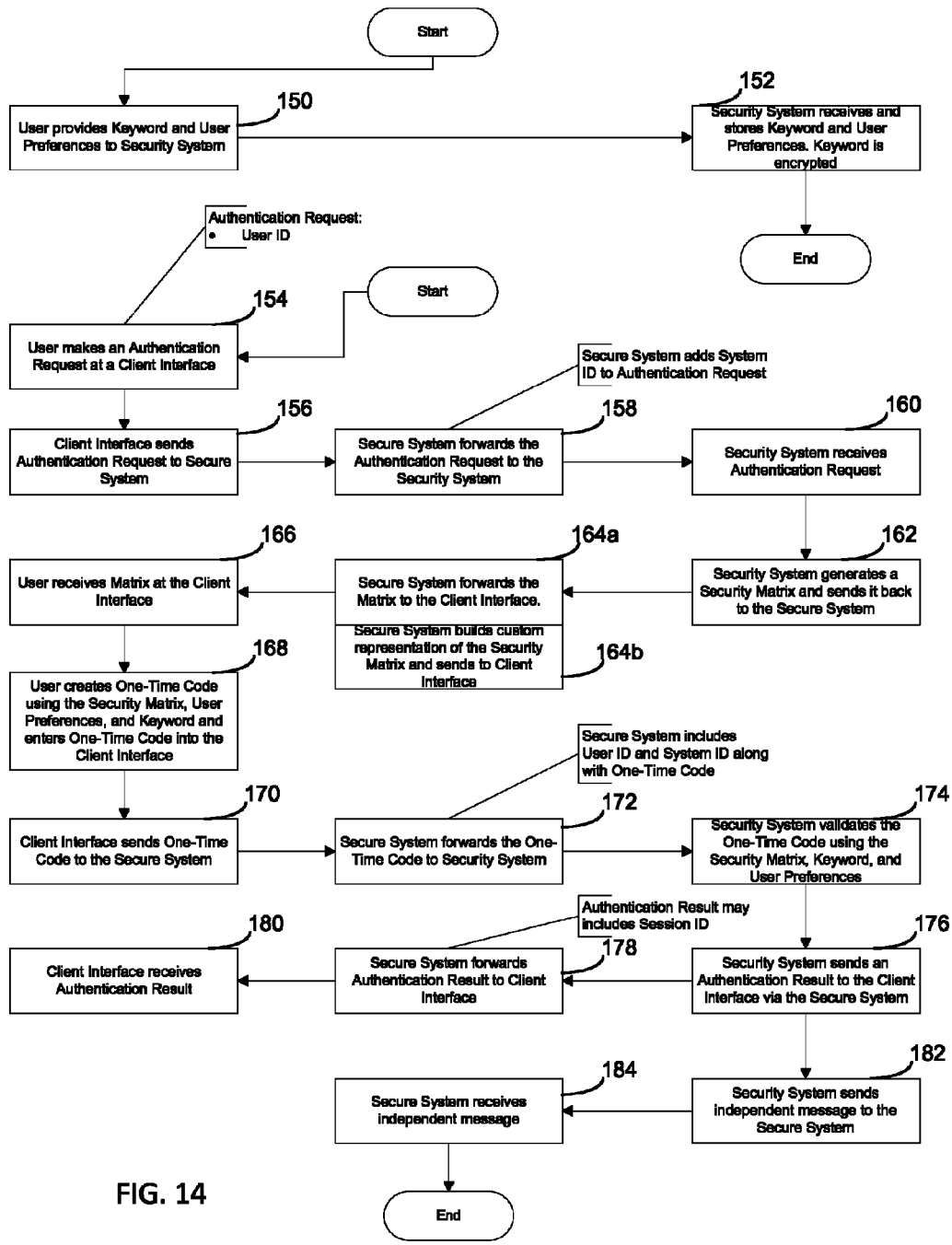
FIG. 14 shows a flow chart of an embodiment of the present invention.

FIG. 14 shows a flow chart of an embodiment of the present invention. The flow chart describes the steps that the client interface, the secure system, and the security system take to authenticate a user requesting access to the secure system. In step 150, the user provides a keyword and his user preferences to the Security System, which receives these items in step 152, and saves them in persistent storage.

In step 154, the user makes an authorization request at a Client Interface, which, in step 156, sends the request to the Secure System. In step 158, the Secure System receives the Authentication Request and forwards it along with the System ID to the Security System, which receives the Authentication Request in step 160. The Security System then generates the Security Matrix in step 162 and send the Matrix to the Secure System in step 164*a* or 164*b*. In Step 164*a*, the Secure System forwards the Matrix to the Client Interface, which receives the Matrix in step 166. In step 164*b*, the Secure System builds a custom representation of the Security Matrix and sends it to the Client Interface, which receives it in step 166.

In step 166, the User also creates the One-Time Code using the Security Matrix, the User Keyword, and the Uer Preferences and enters the One-Time Code into the Client Interface in step 168. The Client Interface then sends the One-Time Code to the Secure System in step 170, which receives the One-Time Code in step 172 and forwards it, along with the User ID and System ID, to the Security System, which receives it in step 174. In step 174, the Security System validates the One-Time Code using the Security Matrix it previously sent, the User Keyword, and the User Preferences. In step 176, the Security System sends the results of its Authentication to the Secure System, along with a Session ID, if the Authentication Result was successful. In step 178, the Secure System forwards the Result to the Client Interface.

Separately, in step 182, the Security System sends a success or fail message to the Secure System, which receives the message in step 184.

Figure 15:
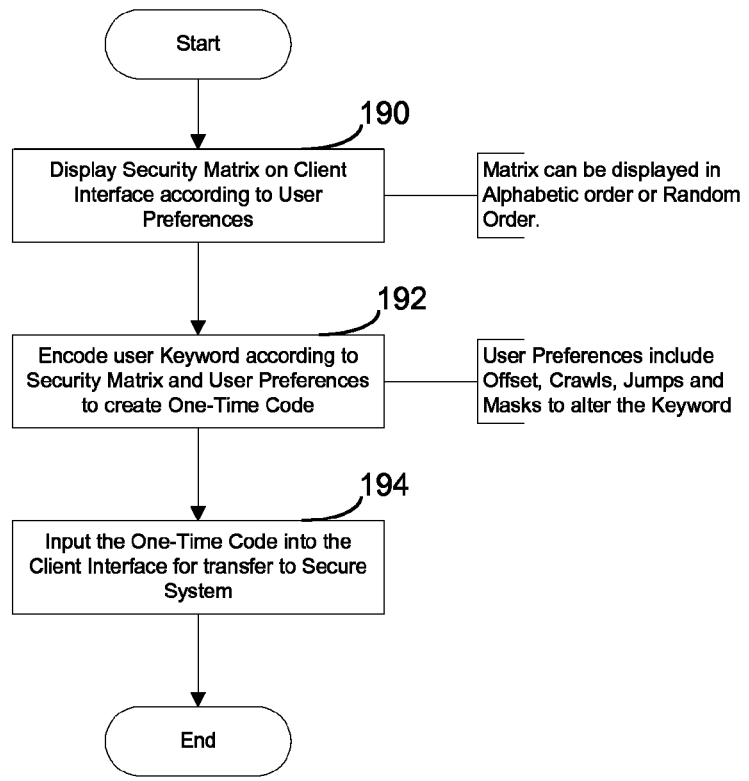
FIG. 15 shows a flow chart of an embodiment for generating and sending the one-time code.

FIG. 15 shows a flow chart of an embodiment for generating and sending the one-time code. In step 190, the Security Matrix is displayed on the Client Interface. The Matrix can be in either Alphabetic or Random Order as specified by the User Preferences. In step 192, the user creates a One-Time Code using the Keyword, the Security Matrix, and the User Preferences, which specify whether Offsets, Crawls, Jumps and Masks, or any combination thereof should be used to form the One-Time Code. In step 194, the user inputs the One-Time Code into the Client Interface so that it can be transferred to the Secure System.

Although the present invention has been described in considerable detail with reference to certain preferred versions thereof, other versions are possible. Therefore, the spirit and scope of the appended claims should not be limited to the description of the preferred versions contained herein.

What is claimed is:

1. A user authentication method comprising execution, by a processing system, of the steps of:

receiving a request from a user to initiate an authentication session, the request comprising a unique identifier of the user;

accessing, using the unique identifier, a record stored in memory associated with the user, the stored record comprising at least code value complexity preference data and a user-defined keyword consisting of an ordered sequence of symbols comprising members of a predetermined symbol set selected from one or more symbol sets supported by the processing system, wherein the symbols of the ordered sequence have been previously selected by the user independently of other users' selections;

generating a one-time security matrix which is valid only for the user during the authentication session, and which comprises a mapping between each symbol within the predetermined symbol set and a code value which is specific to the authentication session and randomly selected from a code set which is distinct from the predetermined symbol set;

transmitting the one-time security matrix for presentation to the user;

receiving an ordered sequence of code values selected from the one-time security matrix and input by the user in response to presentation of the one-time security matrix, and the user's interpretation of the one-time security matrix according to the code value complexity preference data, wherein the interpretation of the one-time security matrix according to the code value complexity preference data causes the order of the ordered sequence of code values to be unknown to the user prior to the presentation of the one-time security matrix;

validating the received ordered sequence of code values by comparison with a corresponding sequence of code values generated, but not transmitted, by the processing system based upon the user-defined keyword in the stored record, the code value complexity preference data and the one-time security matrix; and generating an authentication result of the authentication session based upon the comparison.

2. The method of claim 1 wherein the user-defined keyword is stored in encrypted form.

3. The method of claim 1 wherein the step of generating the one-time security matrix comprises arranging the symbols within the predetermined symbol set in a random order.

4. The method of claim 1 wherein the step of generating the one-time security matrix comprises arranging the symbols within the predetermined symbol set in an alphabetical order.

5. The method of claim 1 wherein:
the step of receiving the request from the user comprises receiving the request from a secure system distinct from the processing system, the secure system having a corresponding secure system identifier;
the request further comprises the secure system identifier; and
the step of generating the one-time security matrix is based upon preferences associated with the secure system identifier.

6. The method of claim 5 wherein the step of transmitting the one-time security matrix for presentation to the user comprises:
transmitting the one-time security matrix to the secure system;
the secure system constructing a custom representation of the one-time security matrix; and
the secure system presenting the custom representation of the one-time security matrix to the user.

7. The method of claim 5 wherein the step of generating the one-time security matrix includes randomly selecting code values from a code set determined in accordance with preferences associated with the secure system identifier.

8. The method of claim 5 wherein the step of receiving an ordered sequence of code values input by the user further comprises receiving the unique identifier of the user and the secure system identifier.

9. The method of claim 1 wherein the step of generating the one-time security matrix comprises randomly selecting code values such that the one-time security matrix is different from any previously generated one-time security matrix.

10. The method of claim 1 further comprising transmitting a session identifier to a secure system to which the user is granted access based upon the authentication result.

11. The method of claim 1 wherein the predetermined symbol set comprises alphabetical characters, and wherein the code set is a set of numerical values.

12. The method of claim 11 wherein the stored record associated with the user comprises user preferences including an offset value, and wherein the step of validating the received ordered sequence of code values comprises generating a corresponding sequence of code values based upon the user-defined keyword in the stored record, the one-time security matrix mapping of symbols to the numerical values of the code set, and calculation of modified code values based upon the offset value.

13. The method of claim 11 wherein the stored record associated with the user comprises user preferences including a crawl value, and wherein the step of validating the received ordered sequence of code values comprises generating a corresponding sequence of code values based upon the user-defined keyword in the stored record, the one-time security matrix mapping of symbols to the numerical values of the code set, and calculation of modified code values based upon the crawl value.

14. The method of claim 11 wherein the stored record associated with the user comprises user preferences including a jump value, and wherein the step of validating the received ordered sequence of code values comprises generating a corresponding sequence of code values based upon the user-defined keyword in the stored record, the one-time security matrix mapping of symbols to the numerical values of the code set, and calculation of modified code values based upon the jump value.

15. The method of claim 11 wherein the stored record associated with the user comprises user preferences including a mask value, and wherein the step of validating the received ordered sequence of code values comprises generating a corresponding sequence of code values based upon the user-defined keyword in the stored record, the one-time security matrix mapping of symbols to the numerical values of the code set, and calculation of modified code values based upon the mask value.

16. The method of claim 1 wherein the stored record associated with a user comprises an alternative user-defined keyword consisting of an ordered sequence of symbols selected from the predetermined symbol set, and wherein:
the step of validating the received ordered sequence of code values further comprises performing a comparison with a corresponding sequence of code values generated, but not transmitted, by the processing system based upon the alternative user-defined keyword in the stored record, the code value complexity preference data and the one-time security matrix; and
in the event that the comparison results in a match, generating the authentication result of the authentication session comprising a panic indication.

17. A user authentication apparatus comprising:
a data store containing one or more records, each of which is associated with a user by a unique identifier and comprises at least code value complexity preference data and a user-defined keyword consisting of an ordered sequence of symbols comprising members of a predetermined symbol set selected from one or more symbol sets supported by a processing system, wherein the symbols of the ordered sequence have been previously selected by the user independently of other users' selections; and
a hardware processor comprising at least one processing unit and stored program instructions which, when executed, cause the at least one processing unit to:
receive a request from the user to initiate an authentication session, the request comprising the unique identifier associated with the user;
access in the data store, using the unique identifier, the stored one or more records associated with the user;
generate a one-time security matrix which is valid only for the user during the authentication session, and which comprises a mapping between each symbol within the predetermined symbol set and a code value which is specific to the authentication session and randomly selected from a code set which is distinct from the predetermined symbol set;
transmit the one-time security matrix for presentation to the user;
receive an ordered sequence of code values selected from the one-time security matrix and input by the user in response to presentation of the one-time security matrix, and the user's interpretation of the one-time security matrix according to the code value complexity preference data, wherein the interpretation of the one-time security matrix according to the code value complexity preference data causes the order of the ordered sequence of code values to be unknown to the user prior to the presentation of the one-time security matrix;
validate the received ordered sequence of code values by comparison with a corresponding sequence of code values generated, but not transmitted, by the processing system based upon the user-defined keyword in the stored one or more records, the code value complexity preference data and the one-time security matrix; and generate an authentication result of the authentication session based upon the comparison.

18. A security system comprising:
a user-authentication apparatus according to claim 17;
a secure system for which the user requires authentication, and which is configured to:
receive the unique identifier of the user;
transmit the request to initiate the authentication session to the user-authentication apparatus, the request comprising the unique identifier of the user;
receive, from the user-authentication apparatus, the one-time security matrix;
present the one-time security matrix to the user;
receive, from the user, the ordered sequence of code values selected from the one-time security matrix;
transmit the ordered sequence of code values to the user-authentication apparatus; and
receive, from the user-authentication apparatus, the authentication result.

19. The security system of claim 18 wherein the secure system is further configured to generate a custom representation of the one-time security matrix for presentation to the user.

20. The security system of claim 18 wherein the secure system is further configured to comprise a web server interface, wherein input is received from the user and the one-time security matrix is presented to the user via a web browser operated by the user.

21. The security system of claim 18 wherein the secure system comprises an automatic teller machine.

22. The security system of claim 18 wherein the secure system comprises a point-of-sale terminal.

23. The security system of claim 18 wherein the secure system is further configured to comprise a web server interface, and the security system further comprises a computer system executing a web browser operated on behalf of the user by a customer representative associated with the secure system.

24. A tangible, non-transitory, computer-readable medium comprising computer-executable instructions recorded thereon which, when executed by a hardware processor result in implementation of a method comprising the steps of:

receiving a request from a user to initiate an authentication session, the request comprising a unique identifier of the user;

accessing, using the unique identifier, a stored record associated with the user, the stored record comprising at least code value complexity preference data and a user-defined keyword consisting of an ordered sequence of symbols comprising members of a predetermined symbol set selected from one or more symbol sets supported by the hardware processor, wherein the symbols of the ordered sequence have been previously selected by the user independently of other users' selections;

generating a one-time security matrix which is valid only for the user during the authentication session, and which comprises a mapping between each symbol within the predetermined symbol set and a code value which is specific to the authentication session and randomly selected from a code set which is distinct from the predetermined symbol set;

transmitting the one-time security matrix for presentation to the user;

receiving an ordered sequence of code values selected from the one-time security matrix and input by the user in response to presentation of the one-time security matrix, and the user's interpretation of the one-time security matrix according to the code value complexity preference data, wherein the interpretation of the one-time security matrix according to the code value complexity preference data causes the order of the ordered sequence of code values to be unknown to the user prior to the presentation of the one-time security matrix;

validating the received ordered sequence of code values by comparison with a corresponding sequence of code values generated, but not transmitted, by the hardware processor based upon the user-defined keyword in the stored record, the code value complexity preference data and the one-time security matrix; and generating an authentication result of the authentication session based upon the comparison.

\* \* \* \* \*